United States Patent
Jiang et al.

(10) Patent No.: US 10,768,489 B2
(45) Date of Patent: Sep. 8, 2020

(54) DISPLAY PANEL WITH SPACERS AND WALLS FOR THE SPACERS, MANUFACTURING METHOD THEREOF AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Songyang Jiang, Beijing (CN); Yongjun Yoon, Beijing (CN); Zhou Rui, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 47 days.

(21) Appl. No.: 15/755,985

(22) PCT Filed: Feb. 16, 2017

(86) PCT No.: PCT/CN2017/073751
§ 371 (c)(1),
(2) Date: Feb. 27, 2018

(87) PCT Pub. No.: WO2017/202066
PCT Pub. Date: Nov. 30, 2017

(65) Prior Publication Data
US 2018/0252958 A1 Sep. 6, 2018

(30) Foreign Application Priority Data
May 26, 2016 (CN) .......................... 2016 1 0369130

(51) Int. Cl.
G02F 1/1339 (2006.01)
G02F 1/1335 (2006.01)
G02F 1/1362 (2006.01)

(52) U.S. Cl.
CPC ........ *G02F 1/13394* (2013.01); *G02F 1/1362* (2013.01); *G02F 1/133512* (2013.01);
(Continued)

(58) Field of Classification Search
CPC combination set(s) only.
See application file for complete search history.

(56) References Cited

U.S. PATENT DOCUMENTS

2007/0070285 A1* 3/2007 Liu ..................... G02F 1/13394
349/156
2007/0247584 A1 10/2007 Li et al.
(Continued)

FOREIGN PATENT DOCUMENTS

CN 101149545 A 3/2008
CN 202033558 U 11/2011
(Continued)

OTHER PUBLICATIONS

China First Office Action, Application No. 201610369130.1, dated Jun. 28, 2018, 16 pps.: with English translation.
(Continued)

*Primary Examiner* — Lauren Nguyen
(74) *Attorney, Agent, or Firm* — Armstrong Teasdale LLP

(57) ABSTRACT

Embodiments of the present disclosure provide a display panel and a manufacturing method thereof, and a display device. The display panel includes a first substrate and a second substrate that are opposite to each other. The display panel further includes a spacer located on the first substrate, and at least two walls located on the second substrate. The at least two walls form a recess region. The spacer corre-
(Continued)

sponds to the recess region. The at least two walls are configured to limit a movement of the spacer. According to the embodiments of the present disclosure, the spacer is effectively prevented from slipping into the display region when the display panel is subjected to an external force.

12 Claims, 4 Drawing Sheets

(52) U.S. Cl.
  CPC ............ *G02F 2001/13396* (2013.01); *G02F 2001/13398* (2013.01); *G02F 2001/13625* (2013.01)

(56) References Cited

U.S. PATENT DOCUMENTS

| | | | | |
|---|---|---|---|---|
| 2010/0103364 | A1* | 4/2010 | Choi | G02F 1/13394 349/157 |
| 2015/0002772 | A1* | 1/2015 | Du | G02F 1/13394 349/43 |
| 2015/0277199 | A1* | 10/2015 | Chang | G02F 1/136286 349/12 |
| 2016/0041441 | A1 | 2/2016 | Park et al. | |

FOREIGN PATENT DOCUMENTS

| | | |
|---|---|---|
| CN | 103439836 A | 12/2013 |
| CN | 104483784 A | 4/2015 |
| CN | 105182642 A | 12/2015 |
| CN | 105807507 A | 7/2016 |

OTHER PUBLICATIONS

English translation of PCT International Search Report, Application No. PCT/CN2017/073751, dated May 3, 2017, 2 pages.

PCT Written Opinion, Application No. PCT/CN2017/073751, dated May 3, 2017, 6 pages.: with English translation of relevant part.

\* cited by examiner

DISPLAY PANEL WITH SPACERS AND WALLS FOR THE SPACERS, MANUFACTURING METHOD THEREOF AND DISPLAY DEVICE

CROSS REFERENCE TO RELATED APPLICATIONS

This patent application is a National Stage Entry of PCT/CN2017/073751 filed on Feb. 16, 2017, which claims the benefit and priority of Chinese Patent Application No. 201610369130.1 filed on May 26, 2016, the disclosures of which are incorporated herein by reference in their entirety as part of the present application.

BACKGROUND

The present disclosure relates to the field of display technologies, and more particularly, to a display panel and a manufacturing method thereof, a display device.

In the process of designing and manufacturing a liquid crystal display, one or more types of spacers are placed inside a display panel to support two opposing glass substrates, namely, an upper glass substrate and a lower glass substrate. When the display panel is pressed by an external force, the upper and lower glass substrates are relatively displaced. The black matrix located on the upper substrate is shifted, leading to a light leakage phenomenon. Meanwhile, the spacer located on the upper substrate may be shifted into a pixel region (a light emitting region). The alignment film (PI film) on the lower substrate may be scratched, causing the liquid crystal orientation disordered.

There is improvement room for existing display panels.

BRIEF DESCRIPTION

Embodiments of the present disclosure provide a display panel and a manufacturing method thereof, and a display device.

A first aspect of embodiments of the present disclosure provides a display panel including a first substrate and a second substrate that are opposite to each other. The display panel further includes a spacer located on the first substrate, and at least two walls located on the second substrate. The at least two walls form a recess region. The spacer corresponds to the recess region. The at least two walls are configured to limit a movement of the spacer.

In embodiments of the present disclosure, the wall includes a body layer and a buffer layer. The body layer is located on the second substrate and protrudes from the second substrate toward the first substrate. The buffer layer is located on a surface of the body layer facing the first substrate.

In embodiments of the present disclosure, a surface roughness of the buffer layer is less than that of the body layer.

In embodiments of the present disclosure, a slope angle of a side of the buffer layer away from the spacer is less than 45 degrees.

In embodiments of the present disclosure, a hardness of the buffer layer is less than that of the body layer.

In embodiments of the present disclosure, the body layer is formed of a source/drain electrode material.

In embodiments of the present disclosure, the body layer is formed of a source/drain electrode material and an active layer material.

In embodiments of the present disclosure, the buffer layer is formed of a photoresist material.

In embodiments of the present disclosure, the first substrate is a color film substrate, and the second substrate is an array substrate.

In embodiments of the present disclosure, the first substrate includes an opaque region, and the spacer is located in the opaque region of the first substrate.

In embodiments of the present disclosure, the display panel further includes a bulge which is located in the recess region of the second substrate and in contact with the spacer.

In embodiments of the present disclosure, the bulge is formed of a source/drain electrode material.

A second aspect of embodiments of the present disclosure provides a method for manufacturing a display panel. The display panel includes a first substrate and a second substrate. The method includes forming a spacer on the first substrate, and forming at least two walls on the second substrate. The at least two walls form a recess region. The spacer corresponds to the recess region. The at least two walls are configured to limit a movement of the spacer.

In embodiments of the present disclosure, forming the wall includes forming a body layer which is located on the second substrate and protrudes from the second substrate toward the first substrate, and forming a buffer layer, which is located on a surface of the body layer facing the first substrate.

In embodiments of the present disclosure, the manufacturing method includes forming a bulge which is located in the recess region of the second substrate and in contact with the spacer.

In embodiments of the present disclosure, the body layer, the buffer layer, and the bulge are formed in the same photolithography process using a gray scale mask or a halftone mask.

In embodiments of the present disclosure, in a photoresist-removal step in the photolithography process, a photoresist on the body layer is retained to form the buffer layer.

A third aspect of embodiments of the present disclosure provides a display device including the above-described display panel.

The display panel and the manufacturing method thereof, and the display device according to the embodiments of the present disclosure, can effectively prevent the spacer from slipping into the display region, when the display panel is subjected to an external force.

BRIEF DESCRIPTION OF THE DRAWINGS

In order to more clearly illustrate the technical solutions of the embodiments of the present disclosure, the drawings of the embodiments will be briefly described below, and it should be appreciated that the drawings described below are only a few of the embodiments of the present disclosure rather than limit the present disclosure, in which.

DETAILED DESCRIPTION

In order to make the technical solutions and advantages of the embodiments of the present disclosure clearer, the technical solutions of the embodiments of the present disclosure will be described below clearly and completely with reference to the accompanying drawings. It is obvious that the described embodiments are merely part but not all of the embodiments of the present disclosure. All other embodiments obtained by those skilled in the art based on the described embodiments of the present disclosure without the creative work are also within the scope of the present disclosure.

Embodiments of the present disclosure provide a display panel including a first substrate and a second substrate that are opposite to each other. The display panel further includes a spacer and at least two walls. The spacer is located on the first substrate. The at least two walls are located on the second substrate. The at least two walls form a recess region. The spacer corresponds to the recess region. The at least two walls are configured to limit a movement of the spacer.

In embodiments of the present disclosure, the display panel may further include a bulge which is located in the recess region of the second substrate and in contact with the spacer. The first substrate may be a color film substrate, and the second substrate may be an array substrate. The first substrate may include an opaque region, and the spacer may be located in the opaque region of the first substrate.

Figure 1:
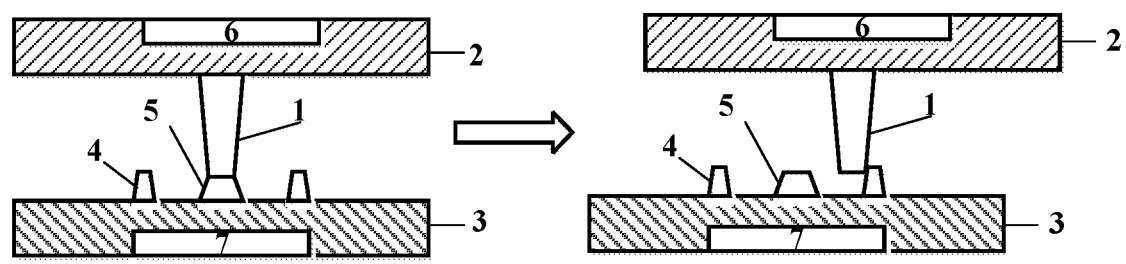
FIG. 1 is a schematic view of the change in structure of a display panel provided in a first embodiment of the present disclosure, before and after being subjected to a force.

FIG. 1 is a schematic view of the change in structure of a display panel provided in a first embodiment of the present disclosure, before and after being subjected to a force. As shown in FIG. 1, when the display panel is pressed by an external force, the spacer 1 limits the relative displacement of the first substrate 2 and the second substrate 3 in the vertical direction in the figure. In addition, the first substrate 2 and the second substrate 3 are relatively displaced in the horizontal direction in the figure. The walls 4 limit the movement of the spacer 1, so that the relative displacement of the first substrate 2 and the second substrate 3 is limited.

In the display panel according to the embodiment of the present disclosure, the walls 4 effectively prevent the spacer 1 from slipping into the display region under an external force. The bulge 5 is in contact with the spacer 1 to provide support, so that the first substrate 2 and the second substrate 3 can be better spaced apart. The spacer 1 is located in the opaque region of the first substrate 2 (for example, the spacer 1 is located between a black matrix 6 of the first substrate 2 and a gate line 7 of the second substrate 3), without affecting the display effect. The spacer 1 may be located on a color film substrate, and the wall 4 may be located on the array substrate, so as to be compatible with the structure of the existing display panel and reduce the cost.

Figure 2:
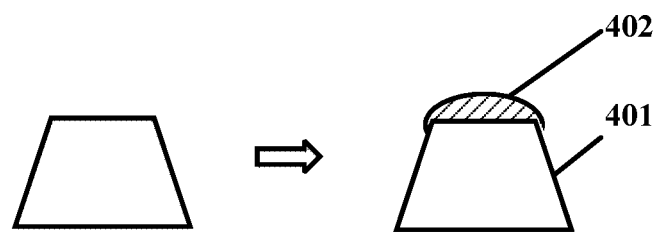
FIG. 2 is a schematic view of the comparison between the structure of the wall of a display panel provided in a second embodiment of the present disclosure and the structure of the wall of the display panel provided in the first embodiment.

FIG. 2 is a schematic view of the comparison between the structure of the wall of a display panel provided in a second embodiment of the present disclosure and the structure of the wall of the display panel provided in the first embodiment. As shown in FIG. 2, the wall 4 may include a body layer 401 which is located on the second substrate 3 and protrudes from the second substrate 3 toward the first substrate 2, and a buffer layer 402 which is located on the surface of the body layer 401 facing the first substrate 2.

Figure 3:
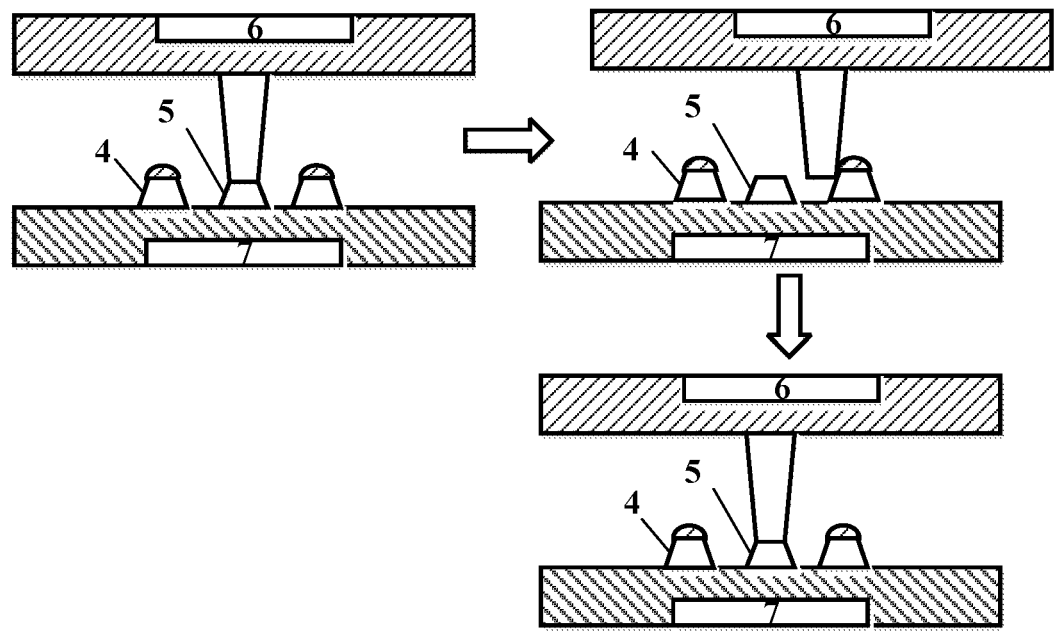
FIG. 3 is a first schematic view of the change in structure of the display panel provided in the second embodiment of the present disclosure, before and after being subjected to a force.

FIG. 3 is a first schematic view of the change in structure of the display panel provided in the second embodiment of the present disclosure, before and after being subjected to a force. As shown in FIG. 3, the spacer 1 limits the relative displacement of the first substrate 2 and the second substrate 3 in the vertical direction in the figure when the display panel is pressed by an external force. The first substrate 2 and the second substrate 3 are relatively displaced in the horizontal direction in the figure. The walls 4 limit the movement of the spacer 1 so that the relative displacement of the first substrate 2 and the second substrate 3 is limited.

In embodiments of the present disclosure, the wall 4 having a multi-layer structure may further effectively limit the movement of the spacer.

Figure 4:
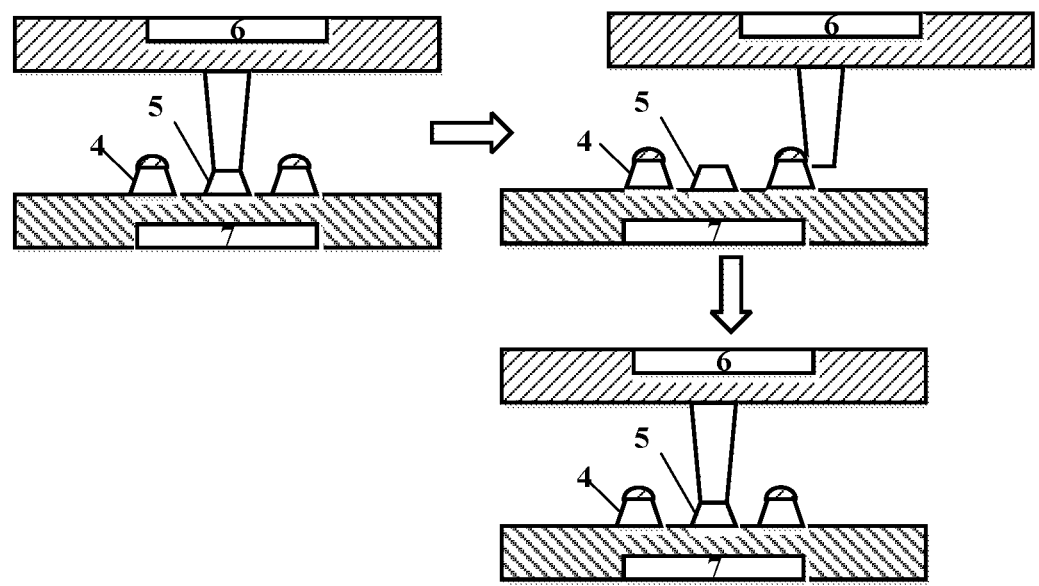
FIG. 4 is a second schematic view of the change in structure of the display panel provided in the second embodiment of the present disclosure, before and after being subjected to a force.

FIG. 4 is a second schematic view of the change in structure of the display panel provided in the second embodiment of the present disclosure, before and after being subjected to a force. As shown in FIG. 4, when the display panel is pressed by an external force, the relative displacement of the first substrate 2 and the second substrate 3 in the horizontal direction in the figure is large, and the spacer 1 slips out of the walls 4. When the external force is removed, it is desirable that the spacer 1 returns to the initial state quickly after slipping out.

Thus, in embodiments of the present disclosure, the surface roughness of the buffer layer 402 may be less than that of the body layer 401. The slope angle of a side of the buffer layer 402 away from the spacer 1 may be less than 45 degrees. The hardness of the buffer layer 402 may be less than the hardness of the body layer 401.

According to embodiments of the present disclosure, the buffer layer 402 has a smaller surface roughness and a smaller hardness, and the spacer 1 slips along a smaller slope angle during recovery. These features further facilitate the quick recovery of the spacer 1 to the initial state after slipping out. Therefore, even if there is a case that the spacer 1 slips out of the wall 4, the spacer 1 may also be quickly recovered to the initial position and state. At this time, no light leakage phenomenon will occur on the display panel, and the picture quality of the display panel will not decline.

In embodiments of the present disclosure, the body layer may be formed of a source/drain electrode material. The buffer layer may be formed of a photoresist material. The bulge may be formed of a source/drain electrode material. The body layer and the bulge may also be formed of a source/drain electrode material and an active layer material.

According to embodiments of the present disclosure, the body layer is formed directly using a source/drain electrode material, the buffer layer is formed using a photoresist material, and the bulge is formed using a source/drain electrode material. The costs may be reduced, without using additional materials.

Embodiments of the present disclosure further provide a method for manufacturing the above-described display panel. The display panel includes a first substrate and a second substrate. The manufacturing method includes forming a spacer on the first substrate, and forming at least two walls on the second substrate. The at least two walls form a recess region. The spacer corresponds to the recess region. The at least two walls are configured to limit the movement of the spacer.

In embodiments of the present disclosure, forming the wall includes forming a body layer which is located on the second substrate and protrudes from the second substrate toward the first substrate, and forming a buffer layer, which is located on the surface of the body layer facing the first substrate.

In embodiments of the present disclosure, manufacturing method includes forming a bulge which is located in the recess region of the second substrate and in contact with the spacer.

In embodiments of the present disclosure, the body layer, the buffer layer, and the bulge are formed in the same photolithography process using a gray scale mask or a halftone mask.

In embodiments of the present disclosure, in the photoresist-removal step in the photolithography process, a photoresist on the body layer is retained to form the buffer layer.

Figure 5:
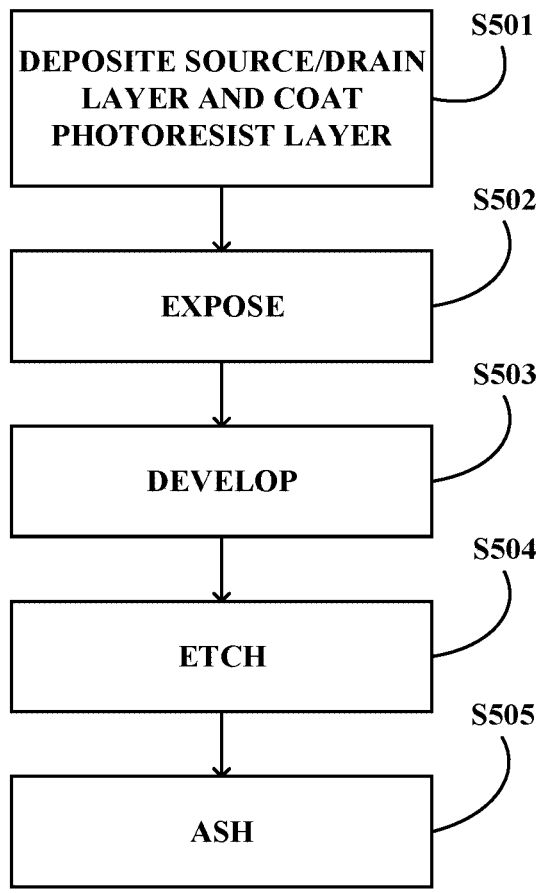
FIG. 5 is a flow chart of steps of forming the wall and the bulge on the second substrate in a method for manufacturing a display panel provided in embodiments of the present disclosure.

FIG. 5 is a flow chart of steps of forming the wall and the bulge on the second substrate in the manufacturing method of the display panel provided in the embodiment of the present disclosure. As shown in FIG. 5, the steps of forming the wall and the bulge include: step S501, depositing a source/drain electrode layer and coating a photoresist layer, step S502, exposing the photoresist layer, step S503, developing the photoresist layer, step S504, etching the source/drain electrode layer, and step S505, ashing the photoresist layer.

Figure 6:
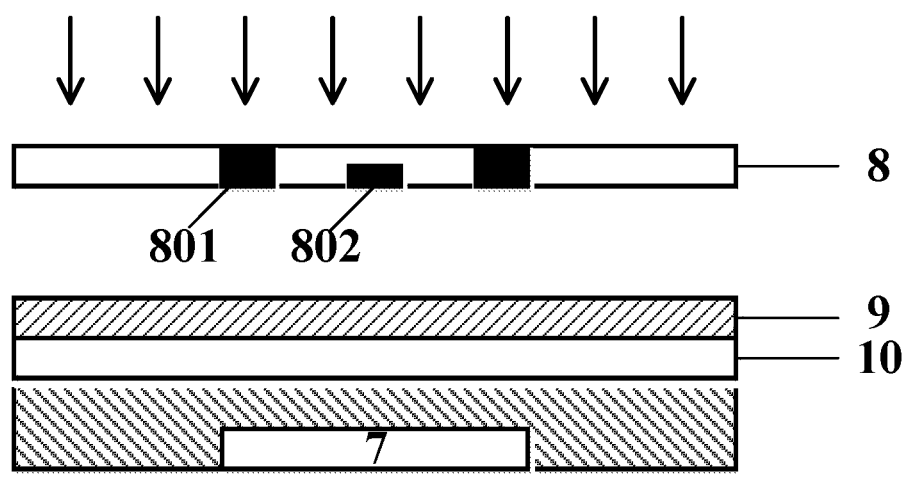
FIG. 6 is a schematic view of the structure of the second substrate at the time of exposure shown in FIG. 5.

FIG. 6 is a schematic view of the structure of the second substrate at the time of exposure shown in FIG. 5. In step S501, the source/drain electrode layer is deposited and the photoresist layer is coated to obtain the second substrate 3 in FIG. 6. Depositing the source/drain electrode layer and coating the photoresist layer includes first depositing a source/drain electrode layer 10 having a thickness of about 1000 to 5000 Å by sputtering or thermal evaporation, and then coating the photoresist layer.

As shown in FIG. 6, in step S502, the exposure includes covering the mask 8 above the second substrate 3 and irradiating to expose the photoresist layer 9. The mask 8 may be a gray scale mask, a halftone mask, etc., so as to control the exposure thickness of the photoresist layer 9 by controlling the luminous flux of the mask. The mask may include thereon a plurality of shading regions having different light transmittance. For example, a shading region 801 has a low light transmittance and a shading region 802 has a high light transmittance. The low light transmittance may be opaque.

In embodiments of the present disclosure, the mask may have a completely opaque shielding region at the wall 4, and may have a partially transmissive shielding region at the bulge 5. The region of the mask corresponding to the position where the second substrate 3 does not need to retain the source/drain electrode layer 10 may be a completely transmissive region.

Figure 7:
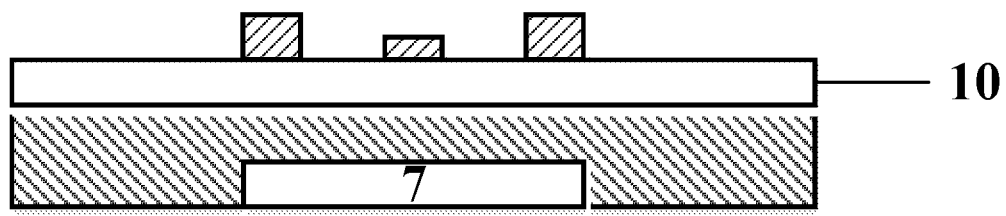
FIG. 7 is a schematic view of the developed second substrate structure shown in FIG. 5.

FIG. 7 is a schematic view of the developed second substrate structure shown in FIG. 5. As shown in FIG. 7, in step S503, the second substrate is developed to remove part of the photoresist of the photoresist layer.

In embodiments of the present disclosure, there is still thick photoresist covered on the developed wall 4. The bulge 5 is also covered with photoresist thereon, but with a thickness lower than the photoresist above the wall 4. No photoresist is covered on the rest position of the second substrate 3 corresponding to the completely transmissive region of the mask.

Figure 8:
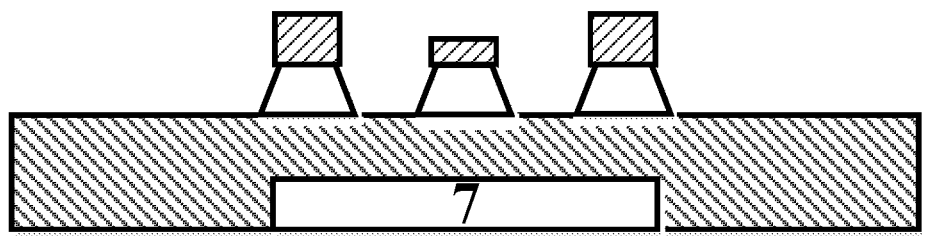
FIG. 8 is a schematic view of the etched second substrate structure shown in FIG. 5.

FIG. 8 is a schematic view of the etched second substrate structure shown in FIG. 5. In step S504, the etching includes removing the source/drain electrode layer 10 covered with no photoresist. The source/drain electrode layer 10 at the positions of the walls 4 and the bulge 5 is retained.

Figure 9:
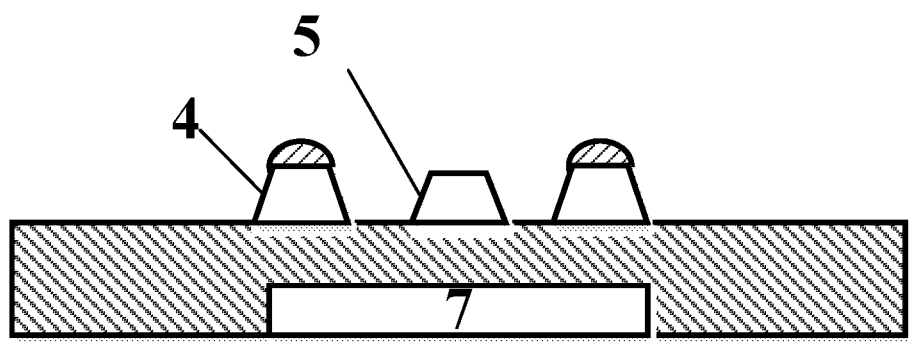
FIG. 9 is a schematic view of the ashed second substrate structure shown in FIG. 5.

FIG. 9 is a schematic view of the ashed second substrate structure shown in FIG. 5. In step S505, the ashing includes removing the photoresist of the photoresist layer 9. After the photoresist at the bulge 5 is removed, the photoresist is still present at the wall 4. Further, the thickness and the shape of the photoresist at the wall 4 can be adjusted by controlling the ashing time. The photoresist retained at the wall 4 forms the buffer layer 402. Without the need for additional processing, the buffer layer 402 has a smoother surface profile, a smaller surface roughness, and a slope angle less than 45 degrees (and also less than the corresponding slope angle of the body layer 401) on one side away from the spacer 1, so that the spacer 1 can be quickly recovered to the initial position after slipping out.

In embodiments of the present disclosure, the photoresist at the wall 4 may be thermally processed and cured.

According to embodiments of the present disclosure, a display panel is manufactured, to effectively prevent the spacer 1 from slipping into the display region when the display panel is subjected to an external force. And the spacer 1 can be quickly recovered to the initial position even after the spacer 1 slips out. Compared with the manufacturing method of the conventional display panel, it is only necessary to adjust the pattern of the mask and control the ashing time when manufacturing the source/drain electrode layer 10. The number of times of exposure is not increased, and the manufacturing steps are not changed at all.

Embodiments of the present disclosure further provide a display device including the above-described display panel. The display device may be any product or component having a display function such as a liquid crystal panel, an electronic paper, an OLED panel, a mobile phone, a tablet computer, a television set, a display, a notebook computer, a digital photo frame, a navigator, and the like.

It is to be understood that the above embodiments are merely exemplary embodiments for the purpose of illustrating the principles of the present disclosure, however, the present disclosure is not limited thereto. Those skilled in the art may make various modifications and improvements without departing from the spirit and essence of the present disclosure, and these modifications and improvements are also considered to be within the scope of the present disclosure.

The invention claimed is:

1. A display panel comprising:
   a first substrate and a second substrate opposite each other;
   a spacer located on the first substrate; and
   at least two walls located on the second substrate, wherein the at least two walls form a recess region, wherein the spacer corresponds to the recess region, and wherein the at least two walls are configured to limit movement of the spacer;
   wherein the wall comprises:
   a body layer, which is located on the second substrate and protrudes from the second substrate toward the first substrate; and
   a buffer layer, which is located on a surface of the body layer facing the first substrate;

wherein a surface roughness of the buffer layer is less than that of the body layer;

wherein a hardness of the buffer layer is less than that of the body layer;

wherein the body layer is formed of a source/drain electrode material and an active layer material;

wherein the buffer layer is formed of a photoresist material;

wherein the display panel further comprises a bulge located in the recess region of the second substrate and in contact with the spacer; and wherein the bulge is formed of a source/drain electrode material.

2. The display panel according to claim 1, wherein the first substrate is a color film substrate, and wherein the second substrate is an array substrate.

3. The display panel according to claim 1,
wherein the first substrate comprises an opaque region; and
wherein the spacer is located in the opaque region of the first substrate.

4. A method for manufacturing a display panel including a first substrate and a second substrate according to claim 1, comprising:
forming a spacer on the first substrate; and
forming at least two walls on the second substrate, wherein the at least two walls form a recess region, wherein the spacer corresponds to the recess region, and wherein the at least two walls are configured to limit a movement of the spacer.

5. The method for manufacturing a display panel according to claim 4, wherein forming at least two walls on the second substrate comprises:

forming a body layer, which is located on the second substrate and protrudes from the second substrate toward the first substrate; and forming a buffer layer, which is located on the surface of the body layer facing the first substrate.

6. The method for manufacturing a display panel according to claim 4, further comprising forming a bulge, which is located in the recess region of the second substrate and in contact with the spacer.

7. The method for manufacturing a display panel according to claim 6, wherein the body layer, the buffer layer, and the bulge are formed in the same photolithography process using at least one of a gray scale mask and a halftone mask.

8. The method for manufacturing a display panel according to claim 7, wherein in a photoresist-removal step in the photolithography process, a photoresist on the body layer is retained to form the buffer layer.

9. A display device comprising a display panel according to claim 1.

10. The display device according to claim 9, wherein the wall comprises:
a body layer, which is located on the second substrate and protrudes from the second substrate toward the first substrate; and
a buffer layer, which is located on a surface of the body layer facing the first substrate.

11. The display device according to claim 10, wherein a surface roughness of the buffer layer is less than that of the body layer.

12. The display panel according to claim 1, wherein a slope angle of a side of the buffer layer away from the spacer is less than 45 degrees.

* * * * *